United States Patent [19]

Eckert et al.

[11] 4,190,492

[45] Feb. 26, 1980

[54] METHOD OF PRODUCING ACOUSTICAL FIBERBOARD

[75] Inventors: Lewis W. Eckert; Olivia D. Stewart, both of Lancaster, Pa.

[73] Assignee: Armstrong Cork Company, Lancaster, Pa.

[21] Appl. No.: 862,845

[22] Filed: Dec. 21, 1977

[51] Int. Cl.$^2$ .............................................. D21H 5/18
[52] U.S. Cl. ................................. 162/145; 162/152; 162/178; 162/183; 162/DIG. 9
[58] Field of Search .................. 162/4, 5, 10, 13, 11, 162/178, 189, 145, 183, DIG. 9, 147, 149, 152; 210/52

[56] References Cited

U.S. PATENT DOCUMENTS

| | | | |
|---|---|---|---|
| 3,235,444 | 2/1966 | Kruger | 162/DIG. 9 |
| 3,578,588 | 5/1971 | Tsuk | 210/52 |
| 3,769,116 | 10/1973 | Champeau | 162/189 |
| 3,895,997 | 7/1975 | Haywood | 162/189 |

FOREIGN PATENT DOCUMENTS

| | | | |
|---|---|---|---|
| 1275042 | 5/1972 | United Kingdom | 162/DIG. 9 |
| 1441234 | 6/1976 | United Kingdom | 162/DIG. 9 |

*Primary Examiner*—S. Leon Bashore
*Assistant Examiner*—Peter Chin

[57] ABSTRACT

An improved method for producing acoustical fiberboard, which method comprises adding agglomerate articles formed from an aqueous composition comprising fiberboard dust, a glactomannan gum or glactomannan gum derivative, and a crosslinking agent to an aqueous fiberboard slurry, is disclosed. The resulting acoustical fiberboard exhibits excellent sound absorption.

4 Claims, No Drawings

METHOD OF PRODUCING ACOUSTICAL FIBERBOARD

This invention relates to fiberboard.

More specifically, this invention relates to a method for producing acoustical fiberboard which contains mineral wool fibers.

The production of mineral wool-containing fiberboard using a Fourdrinier or cylinder machine is well known. Generally, the resulting fiberboard is further processed to form acoustical ceiling tiles, wall panels, and the like. Also known in the art is the need for fiberboard compositions and related methods of production which facilitate processability of the compositions and result in fiberboard products having good sound-absorbing properties.

The present invention provides an improved method for producing an acoustical fiberboard which exhibits excellent sound absorption.

According to this invention, there is provided an improved method for producing acoustical fiberboard of the type produced by removing water from an aqueous fiberboard slurry comprising mineral wool fibers and a binder, wherein the improvement comprises adding agglomerated particles formed from an aqueous composition comprising fiberboard dust, a glactomannan gum or glactomannan gum derivative, and a cross-linking agent to the aqueous fiberboard slurry prior to removing water from the aqueous fiberboard slurry.

Also, according to this invention, there is provided mineral wool-containing fiberboard produced by the above-described method.

As used herein, the term "fiberboard dust" is understood to mean fiberboard particulate, typically having the following analysis as determined by D.N. 5742—Standard Sieve Series:

| U.S. Sieve No. | Opening Range (mm) | Approximate % by Weight |
| --- | --- | --- |
| +20 | 0.84 | up to 15 |
| −20, +30 | 0.59 to 0.84 | up to 15 |
| −30, +50 | 0.297 to 0.59 | 10 to 30 |
| −50, +70 | 0.210 to 0.297 | 5 to 30 |
| −70, +100 | 0.149 to 0.210 | 5 to 30 |
| −100, +200 | 0.074 to 0.149 | 10 to 50 |
| −200, +pan | 0.0074 | 10 to 50 |

The aqueous composition suitable to produce agglomerated particles of this invention will contain from about 5 to about 30 percent by weight of fiberboard dust. In its preferred form, the composition will contain about 20 percent by weight of the fiberboard dust.

Any suitable fiberboard dust can be employed. Fiberboard dust suitable for use is recoverable as a scrap by-product of the various processing steps (cutting, sanding, sawing, etc.) employed to produce acoustical ceiling tiles and wall panels from fiberboard.

Employed in the examples of this invention and particularly suitable for use is a mineral wool-containing fiberboard dust having the following analysis as determined by D.N. 5742— Standard Sieve Series:

| U.S. Sieve No. | % by Weight |
| --- | --- |
| +20 | 9.6 |
| −20, +30 | 3.2 |
| −30, +50 | 20.8 |
| −50, +70 | 11.2 |
| −70, +100 | 10.3 |
| −100, +200 | 18.0 |
| −200, +pan | 26.9 |

The aqueous composition will contain from about 0.5 to about 3 percent by weight of a glactomannan gum or derivative thereof. In its preferred form, the composition will contain about 0.45 percent by weight of the glactomannan gum.

Any suitable glactomannan gum can be employed including locust bean and guar gum. Particularly suitable for use are two nonionic guar gums designated "JAGUAR A-40-F" and "JAGUAR A2S," both commercially available from Stein, Hall and Co., Inc.

"JAGUAR A-40-F" has a mesh size of 250, a pH of 1% solution of from 6 to 7 and contains 0.75% ash.

"JAGUAR A2S" has a mesh size of 150, a pH of from 6 to 8.5 and contains 15% ash.

Also particularly suitable for use and commercially available from Stein, Hall and Co., Inc. are glactomannan derivatives designated "JAGUAR HP-11," "JAGUAR CMHP," and "JAGUAR C-13."

"JAGUAR HP-11" is a nonionic hydroxypropyl guar gum derivative having an M.S. (moles of substitution) hydroxylpropyl of from 0.35 to 0.45 mole, a mesh size of 150, a pH of 1% solution of from 6 to 7 and contains 2% ash.

"JAGUAR CMHP" is an anionic carboxymethyl-hydroxypropyl guar gum derivative having an M.S. hydroxypropyl of from 0.35 to 0.45 mole, a D.S. (degree of substitution) carboxymethyl of about 0.06, a mesh size of 150, a pH of 1% solution of from 10 to 10.5 and contains 5–6% ash.

"JAGUAR C-13" is a cationic guar gum derivative having a D.S. quaternary of about 0.13, a mesh size of 150, a pH of 1% solution of from 5 to 7 and contains 1% ash. "JAGUAR C-13" has the following generalized molecular structure:

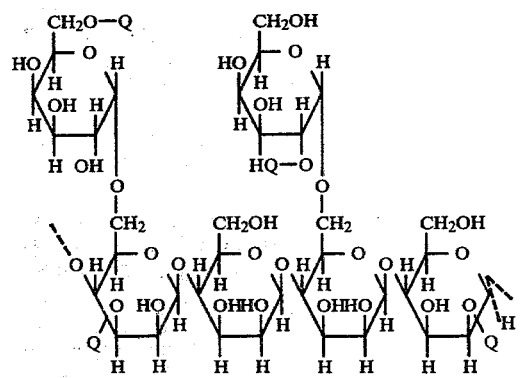

wherein Q represents quaternary ammonium groups.

"JAGUAR C-13" is particularly suitable for use because, when employed, agglomerated particles are formed by syneresis. If other glactomannan gums are employed, an additional processing step (for example, granulating by means of two counter-rotating cylinders) may be necessary to form the agglomerated particles.

The aqueous composition will contain from about 0.02 to about 2.5 percent by weight of a crosslinking agent. In its preferred form, the composition will contain about 0.15 percent by weight of the crosslinking agent.

Any suitable crosslinking agent can be employed. Particularly suitable crosslinking agents are those which contain borate ions, for example, borax and boric acid.

Other suitable crosslinking agents suitable for use in this invention are taught in U.S. Pat. Nos. 3,202,556; 3,301,723; 3,072,509; and 3,578,588, the disclosures of which are hereby incorporated by reference.

Water will comprise the balance of the aqueous composition, such that the composition contains from about 5 to about 30 weight percent solids of the fiberboard dust.

The aqueous fiberboard slurry into which the agglomerated particles are incorporated can also comprise at least one filler and at least one cellulosic fiber.

In a preferred embodiment, the agglomerated particles will be incorporated into an aqueous fiberboard slurry comprising in weight percent solids, mineral wool fibers in an amount within the range of from about 20 to about 90, naturally occurring starch binder in an amount with the range of from 3 to about 12, newsprint fibers in an amount up to about 20, expanded perlite in an amount up to about 50, and clay in an amount up to about 40.

Water will comprise the balance of the aqueous fiberboard slurry such that the resulting slurry contains from about 1 to about 10 weight percent solids. In its preferred form, the slurry will contain about 3 weight percent solids.

In the method according to this invention, the agglomerated particles will be incorporated into the aqueous fiberboard slurry in a solids ratio of from about 10 to about 50 weight percent agglomerated particles to about 50 to about 90 weight percent aqueous fiberboard slurry such that the resulting slurry contains from about 1 to about 10 weight percent total solids, preferably about 3 weight percent total solids.

Having described the ingredients of the invention, reference is now made to the following examples which are provided by way of illustration and not by way of limitation of the practices of the invention.

EXAMPLE I

This example demonstrates the best mode for preparing an agglomerated particles suitable for use in the present invention.

About 545 parts by weight of water and about 250 parts by weight of fiberboard dust (described above) were added to a change-can mixer with stirring at room temperature.

About 7.5 parts by weight of a glactomannan gum derivative ("JAGUAR C-13") were predispersed in 370 parts by weight water in order to hydrate the gum, the dispersion was added to the resulting slurry and stirring was continued until a sol was obtained.

About 125 parts by weight of a crosslinking agent (a 5% borax solution) were introduced into the mixer with stirring.

Next, the pH was adjusted to a pH above 8 with a suitable base (e.g., NaOH) to form a gel which was found to have a solids content of about 20 weight percent.

The gel was allowed to contract, resulting in the formation of agglomerated particles having diameters of from about 0.03 to about 0.4 inch.

EXAMPLE II

This example demonstrates the preparation of an aqueous fiberboard slurry and fiberboard produced therefrom.

About 9700 parts by weight of water and about 135 parts by weight of mineral wool fibers having an average fiber length of about 1/16 inch were added to a mix tank at room temperature with stirring.

About 70 parts by weight of cellulosic fibers (newsprint fibers) having a Canadian Standard freeness of about 500 ml. were added to the contents of the mix tank with stirring.

About 20 parts by weight of binder (corn starch) were added to the contents of the mix tank with stirring.

About 75 parts by weight of expanded perlite were introduced into the contents of the main mix tank with stirring.

The resulting slurry was recovered, found to have a solids content of about 3 weight percent, and employed in a conventional manner on a Fourdrinier machine to produce acoustical fiberboard.

EXAMPLE III

This example demonstrates the best mode of producing a mineral wool-containing acoustical fiberboard of this invention.

Into about 7000 parts by weight of the aqueous fiberboard slurry of Example II, adjusted to a pH of about 8, were introduced about 450 parts by weight of the agglomerated particles of Example I with stirring. The resulting slurry was adjusted with water to total 10,000 parts by weight, found to have a total solids content of about 3 weight percent, and employed in a conventional manner on a Fourdrinier machine to produce acoustical fiberboard.

EXAMPLE IV

This example demonstrates an acoustical fiberboard containing 30 weight percent solids of fiberboard dust. The fiberboard dust was not added according to the method of this invention, that is, not in the form of agglomerated particles but rather as a separate ingredient.

Into about 7000 parts by weight of the aqueous fiberboard slurry of Example II were introduced about 90 parts by weight of fiberboard dust (described above) with stirring. The resulting slurry was adjusted with water to total 10,000 parts by weight.

The slurry was recovered and employed in a conventional manner on a Fourdrinier machine to produce acoustical fiberboard.

EXAMPLE V

The processability of the slurries and the resulting acoustical fiberboards produced in Examples II, III, and IV were evaluated for water drain time on a Fourdrinier and for air flow resistance with the following results:

| Acoustical Fiberboard of Example: | II | III | IV |
|---|---|---|---|
| Drain Time on Fourdrinier (sec) | 13 | 11 | 14 |
| Air Flow Resistance:[1] | | | |
| Acoustical Ohms | 46.8 | 26.9 | 51.4 |

-continued

| Acoustical Fiberboard of Example: | II | III | IV |
|---|---|---|---|
| Rayls | 2000.0 | 880.0 | 1900.0 |

[1] See R. W. Leonard, "Simplified Flow Resistance Measurements", Journal of the Acoustical Society of America, 17, 240–241 (1946).

The above data show that the acoustical fiberboard of Example III, which acoustical fiberboard was produced according to this invention, achieved improved drain time on a Fourdrinier machine and improved air flow resistance when compared to the acoustical fiberboards of Examples II (control) and IV (closest prior art).

Accordingly, the above data serves to show that the present invention provides a method for producing acoustical fiberboard having improved processability and sound absorption.

It is evident from the foregoing that various modifications can be made to this invention. Such modifications are considered as being within the scope of this invention.

What is claimed is:

1. A method for increasing the sound absorption of a conventional acoustical fiberboard of the type produced by removing water from an aqueous fiberboard slurry comprising mineral wool fibers and a binder, the improvement comprising incorporating agglomerated particles into said aqueous fiberboard slurry prior to removing water from said slurry, said agglomerated particles being in the form of balls having diameters of from about 0.03 to about 0.4 inch, being formed from an aqueous composition comprising fiberboard dust, 0.5 to about 3 percent by weight of the aqueous composition of a glactomannan gum or glactomannan gum derivative, and 0.02 to about 2.5 percent by weight of a crosslinking agent, and being incorporated in an amount to yield an agglomerated particle-fiberboard slurry solids ratio of from about 10 to about 50 weight percent agglomerated particles to about 50 to about 90 weight percent fiberboard slurry solids.

2. The method of claim 1 in which said aqueous composition comprises from about 5 to about 30 percent by weight fiberboard dust.

3. The method of claim 1 in which said aqueous fiberboard slurry also comprises at least one filler and at least one cellulosic fiber.

4. Mineral wool-containing fiberboard produced according to the method of claim 1.

* * * * *